United States Patent
Ise

(10) Patent No.: US 10,385,482 B2
(45) Date of Patent: Aug. 20, 2019

(54) WOVEN FABRIC

(71) Applicant: ASAHI KASEI FIBERS CORPORATION, Osaka (JP)

(72) Inventor: Fumiaki Ise, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 318 days.

(21) Appl. No.: 14/911,908

(22) PCT Filed: Aug. 12, 2014

(86) PCT No.: PCT/JP2014/071273
§ 371 (c)(1),
(2) Date: Feb. 12, 2016

(87) PCT Pub. No.: WO2015/022954
PCT Pub. Date: Feb. 19, 2015

(65) Prior Publication Data
US 2016/0194790 A1 Jul. 7, 2016

(30) Foreign Application Priority Data
Aug. 13, 2013 (JP) .................. 2013-168134

(51) Int. Cl.
D03D 1/02 (2006.01)
B60R 21/235 (2006.01)
D03D 15/00 (2006.01)

(52) U.S. Cl.
CPC ............. *D03D 1/02* (2013.01); *B60R 21/235* (2013.01); *D03D 15/0083* (2013.01); *B60R 2021/23509* (2013.01); *D10B 2505/124* (2013.01)

(58) Field of Classification Search
CPC ................ D03D 1/02; D03D 15/0083; D10B 2505/124; B60R 2021/23509; B60R 21/235
See application file for complete search history.

(56) References Cited

U.S. PATENT DOCUMENTS 5,098,125 A * 3/1992 Thornton .............. B60R 21/235
139/389
5,514,471 A 5/1996 Okano et al.
(Continued)

FOREIGN PATENT DOCUMENTS

| EP | 2 264 235 | 12/2010 |
| JP | 2006-299411 A | 10/1994 |

(Continued)

OTHER PUBLICATIONS

Supplemental European Search Report in counterpart European Patent Application No. 14836923.4, dated Jul. 16, 2016.
(Continued)

*Primary Examiner* — Clinton T Ostrup
*Assistant Examiner* — Andrew Wayne Sutton
(74) *Attorney, Agent, or Firm* — Finnegan, Henderson, Farabow, Garrett & Dunner, LLP

(57) ABSTRACT

The purpose of the present invention is to improve thermal stability in a lightweight woven fabric that is useful for air bag applications and the like. This woven fabric comprises synthetic fibers, and is characterized in that, with regard to a rising temperature differential scanning calorimetry (DSC) endothermic curve for the woven fabric, the ratio of the amount of heat absorbed on the high temperature side of the maximum temperature of the melting endotherm on the rising temperature DSC endothermic curve for a woven fabric structure, to the overall heat absorbed exceeds 45%.

10 Claims, 3 Drawing Sheets

(56) References Cited

U.S. PATENT DOCUMENTS

| | | | |
|---|---|---|---|
| 5,657,798 A * | 8/1997 | Krummheuer | B60R 21/235 |
| | | | 139/384 R |
| 6,022,817 A * | 2/2000 | Lewis | B60R 21/235 |
| | | | 139/389 |
| 6,182,709 B1 | 2/2001 | Konishi et al. | |
| 6,283,507 B1 * | 9/2001 | Kami | B60R 21/233 |
| | | | 139/389 |
| 6,429,155 B1 * | 8/2002 | Li | B32B 27/02 |
| | | | 280/728.1 |
| 6,586,551 B2 * | 7/2003 | Bohin | B60R 21/235 |
| | | | 528/15 |
| 2003/0008582 A1 * | 1/2003 | Koketsu | D01D 5/253 |
| | | | 442/195 |
| 2003/0060103 A1 | 3/2003 | Nagaoka et al. | |
| 2010/0048079 A1 | 2/2010 | Fujiyama et al. | |
| 2011/0036447 A1 | 2/2011 | Horiguchi et al. | |
| 2012/0225229 A1 | 9/2012 | Ise | |
| 2012/0231273 A1 | 9/2012 | Horiguchi et al. | |
| 2013/0147170 A1 | 6/2013 | Tanaka et al. | |
| 2015/0115574 A1 * | 4/2015 | Enoki | B60R 21/235 |
| | | | 280/728.1 |
| 2016/0193979 A1 | 7/2016 | Ise | |

FOREIGN PATENT DOCUMENTS

| | | |
|---|---|---|
| JP | 2007-310227 A | 11/1995 |
| JP | 08-011660 | 1/1996 |
| JP | 2011-158743 A | 6/1999 |
| JP | 2000-303303 | 10/2000 |
| JP | 2002-146646 A | 5/2002 |
| JP | 2002-363836 A | 12/2002 |
| JP | 2003-171841 A | 6/2003 |
| JP | 3457739 | 10/2003 |
| JP | 2004/149992 | 5/2004 |
| JP | 2004-156166 | 6/2004 |
| JP | 2006-183205 A | 7/2006 |
| JP | 2006-249655 A | 9/2006 |
| JP | 2006-306312 | 11/2006 |
| JP | 2008-025089 A | 2/2008 |
| JP | 2009-243030 A | 10/2009 |
| JP | 2009-256860 | 11/2009 |
| JP | 2010-100988 A | 5/2010 |
| JP | 2011-058118 | 3/2011 |
| JP | 2013-523524 | 6/2013 |
| JP | 5848856 B2 | 1/2016 |
| WO | WO 2011/055562 A1 | 5/2011 |
| WO | WO 2011/124315 | 10/2011 |
| WO | WO 2012/026455 A1 | 3/2012 |

OTHER PUBLICATIONS

Encyclopaedia Chimica, $6^{th}$ Reduced Edition, Jul. 15, 1961, p. 594.
Journal of Fiber Science and Technology, $3^{rd}$ Edition, Dec. 15, 2004, pp. 114-119.
Journal of Fiber Science and Technology, $3^{rd}$ Edition, Dec. 15, 2004, p. 169.
English-language International Search Report from the Japanese Patent Office for International Application No. PCT/JP2014/071273, dated Nov. 18, 2014.
Notification of Transmittal of Translation of the International Preliminary Report on Patentability dated Feb. 25, 2016, and International Preliminary Report on Patentability dated Feb. 16, 2016, from the International Bureau.
Written Opinion of the International Searching Authority No. PCT/JP2014/071273, dated Nov. 18, 2014.

* cited by examiner

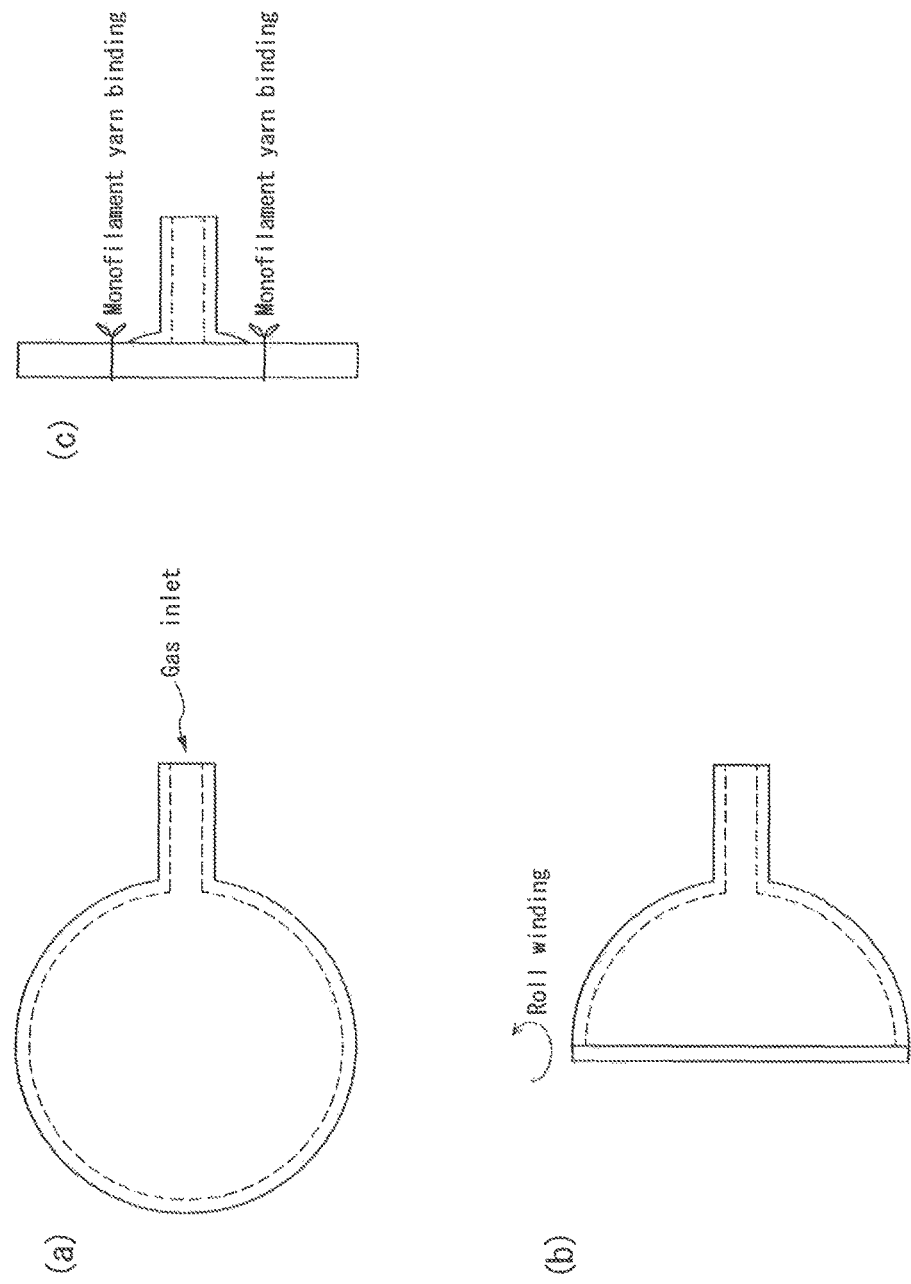

WOVEN FABRIC

CROSS REFERENCE TO RELATED APPLICATIONS

This application is a national phase application based on PCT/JP2014/071273, filed Aug. 12, 2014, which claims the priority of Japanese Patent Application No. 2013-168134, filed Aug. 13, 2013, the content of each application being incorporated herein by reference.

TECHNICAL FIELD

The present invention relates to a woven fabric suitable for an air bag or the like to be used as a bag in an air bag device as a device for protecting occupants during vehicle collision. In particular, it relates to a woven fabric that has excellent thermal stability suitable for use in an air bag or the like.

BACKGROUND ART

Advances have been made in mounting of air bags in vehicles, as devices that serve to alleviate impact on the human body during collision accidents of vehicles such as automobiles. Air bags that absorb and alleviate impact on the human body by deploying with gas upon collision continue to be implemented for occupant protection, with installation of curtain air bags or side air bags, knee air bags, rear air bags and the like, in addition to driver seat and passenger seat air bags, in vehicles. Furthermore, for pedestrian protection, air bags have also been proposed that are installed so as to expand out of the vehicle cabin.

Such air bags are normally housed in a small folded state. When an accident impact has been detected by a sensor and the air bag is deployed and expanded, gas generated by an inflator causes the folding to be pushed and spread out, while the cover section of the housing is ripped open and the air bag flies out, receiving the human body at a point where it has sufficiently deployed.

In recent years, there has been a demand for air bags to deploy more rapidly in order to adapt to a wider range of collision conditions. They are therefore being deployed with high-temperature, high-pressure gas, with inflators using propellants with higher output. It is therefore necessary to increase the heat and pressure resistance of the bags, for more highly safe air bags. Another issue, for maintaining long-term performance, is to reduce the high-pressure air permeability after exposure to heat.

Patent Document 1 describes an air bag woven fabric having a resin coating film, the coating being with a specific resin composition, whereby the melting point increases as measured with a differential scanning calorimeter, and damage is avoided during high-temperature deployment of the air bag. In order to suppress air permeability it is effective to employ a method of providing a resin coating film on the fabric, but for more high-speed deployment, it is advantageous to use a lightweight woven fabric without a resin coating film.

PRIOR ART DOCUMENTS

Patent Documents

Patent Document 1: Japanese Unexamined Patent Publication (Kokai) No. 2004-149992

SUMMARY OF THE INVENTION

Problems to be Solved by the Invention

It is an object of the present invention to improve the thermal stability of a lightweight woven fabric that is useful for an air bag or the like, without coating or impregnation of elastomers or resins.

Means for Solving the Problems

The present inventors have completed this invention upon finding that by increasing the mutual constraining force between the weaving yarns of a woven fabric, so that the melting behavior of the woven fabric is toward a higher temperature as measured with a differential scanning calorimeter, it is possible to obtain a woven fabric with excellent thermal stability.

Specifically, the invention provides the following.

(1) A woven fabric comprising synthetic fibers, wherein in a rising-temperature DSC endothermic curve of the woven fabric, the ratio of the amount of heat absorbed on the high-temperature side of the peak temperature of the melting endotherm in the rising-temperature DSC endothermic curve of the constituent thread of the woven fabric, to the overall heat absorbed exceeds 45%.

(2) The woven fabric according to (1) above, wherein the tan δ peak temperature of viscoelasticity of the constituent yarn of the woven fabric is 115° C. or higher.

(3) The woven fabric according to (1) or (2) above, wherein the oil adhesion rate is between 0.05 wt % and 0.20 wt %, inclusive.

(4) The woven fabric according to any one of (1) to (3) above, wherein the larger of the flatnesses of the warp yarn and weft yarn constituting the woven fabric (spread of filaments in planar direction/spread of filaments in thickness direction) is 3.0 or greater.

(5) The woven fabric according to any one of (1) to (4) above, wherein the synthetic fiber is polyamide 66 fiber.

(6) The woven fabric according to any one of (1) to (5) above, wherein the cross-section of the filaments of the constituent yarn of the woven fabric is a circular cross-section.

(7) The woven fabric according to any one of (1) to (6) above, wherein the Frazier air permeability after exposure to an environment of 110° C. for 100 hours is no greater than 0.5 cc/cm²/sec.

(8) The woven fabric according to any one of (1) to (7) above, wherein the strength of the raw yarn used for weaving is 8.0 cN/dtex or greater.

(9) The woven fabric according to any one of (1) to (8) above, wherein the warp yarn tension during weaving is 0.20 to 0.65 cN/dtex.

(10) The woven fabric according to any one of (1) to (9) above, which is produced by weaving with a water jet loom, followed by dry finishing either without scouring or with scouring at no higher than 80° C.

(11) The woven fabric according to any one of (1) to (10) above, wherein the dry finishing after weaving is carried out at no higher than 140° C.

(12) The woven fabric according to any one of (1) to (11) above, which is not coated with a resin.

(13) An air bag employing the woven fabric according to any one of (1) to (12) above.

Effect of the Invention

The woven fabric of the invention is a lightweight woven fabric without a resin coating film, and when used in an air bag, it has excellent suppression of high-pressure air permeability after exposure to heat, and excellent thermal stability including high avoidance of damage during high-temperature, high-pressure deployment.

BRIEF DESCRIPTION OF THE DRAWINGS

FIG. 4 is a set of diagrams of an air bag used for evaluation of deployment.

EMBODIMENTS FOR CARRYING OUT THE INVENTION

Figure 1:
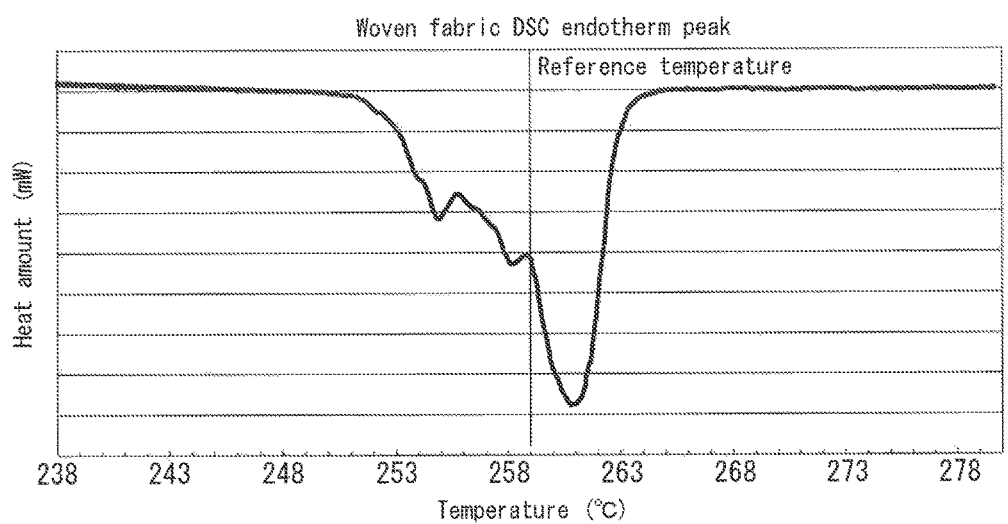
FIG. 1 is a graph showing a DSC endothermic curve for a woven fabric of the invention.

The invention will now be explained in detail.

The woven fabric of the invention is composed of synthetic fiber, the synthetic fiber forming the woven fabric being fiber made of a thermoplastic resin, and for example, it may be selected from among polyamide fiber, polyester fiber and the like.

Polyamide fiber forming the woven fabric may be fiber made of a resin such as polyamide 6, polyamide 6/6, polyamide 11, polyamide 12, polyamide 6/10, polyamide 6/12, polyamide 4/6, or their copolymers, or a mixture thereof. Particularly preferred as polyamide 6/6 fiber is fiber composed mainly of polyhexamethyleneadipamide resin. Polyhexamethyleneadipamide resin is a polyamide resin with a melting point of 250° C. or higher, composed of 100% hexamethylenediamine and adipic acid, but fiber made of polyamide 6/6 resin to be used for the invention may be fiber made of a resin in which polyamide 6, polyamide 6/I, polyamide 6/10, polyamide 6,T or the like is copolymerized or blended with polyhexamethyleneadipamide, in a range such that the melting point of the resin is not below 250° C.

Such synthetic fibers may include various commonly used additives for improving productivity in the thread production process or finishing process, or for improving the properties. For example, heat stabilizers, antioxidants, light stabilizers, lubricating agents, antistatic agents, plasticizers, flame retardants and the like may be added.

The synthetic fiber preferably has no more than 100 broken filaments per $10^8$ m, resulting from filament breakage, so as to allow high-density weaving without sizing agent during warping. Also, in order to obtain a converging property for the multifilaments, the air tangling is preferably from 5 to 30 times/m. If the air tangling is no greater than 30 times/m, converging of the filaments of the synthetic fiber in the woven fabric will be suitable, without excessive reduction in permeation of the coating resin into the woven fabric, thereby contributing to the adhesion and strength of the resin coating film. If the air tangling is 5 times/m or greater, loom stoppage caused by filament separation or filament breaking during the high-density weaving step will be prevented.

The weaving yarn composed of the synthetic fiber is preferably conveyed to the warping step without attaching sizing, and after having been passed through the crude warping beam, it is rewound onto the assembled warping beam for use as the warp yarn. Also, a portion is supplied as weft yarn, and weaving is carried out.

The raw yarn comprising synthetic fiber to be used for weaving has a tensile strength of preferably 8.0 cN/dtex or greater. It is more preferably 8.5 cN/dtex or greater. Synthetic fiber with high tensile strength is produced by high-temperature high-stretching, and contributes to increasing the tan δ peak temperature in measurement of the viscoelasticity of the constituent threads. On the other hand, the tensile strength of the raw yarn comprising the synthetic fiber is preferably no greater than 10.0 cN/dtex. If the tensile strength is no greater than 10.0 cN/dtex, the fluff quality will be satisfactory and it will be easier to obtain fibers suitable for weaving.

The weaving yarn forming the woven fabric preferably has a tan δ peak temperature of 115° C. or higher, where tan δ exhibits a peak in measurement of the viscoelasticity. It is more preferably 120° C. or higher. The tan δ peak temperature is the temperature at which most of the molecular chains at the amorphous portions of the polymer begin to experience thermal motion. A higher peak-top temperature corresponds to higher thermal stability over time. According to the invention, a tan δ peak temperature of 115° C. or higher contributes to stable air permeability after passage of time with heat-treatment, and suppresses increase in air permeability. From the viewpoint of economical and easily obtainable synthetic fibers, the tan δ peak temperature is preferably no higher than 150° C.

The fineness of the synthetic fiber forming the woven fabric is preferably from 200 to 800 dtex. In addition, the synthetic fiber forming the woven fabric is multifilament yarn composed of multiple filaments, the fineness of the filaments being preferably 1 to 8 dtex. A small filaments fineness of 8 dtex or smaller will facilitate obtainment of a woven fabric form with interlocking between the weaving yarn. If the filament fineness is 1 dtex or greater, filament damage will not be suffered during the processing step, and the mechanical properties of the woven fabric will not be impaired. The cross-sectional shape of a single filament is preferably essentially a circular cross-section. A flatter single thread cross-sectional shape will make it difficult to dynamically suppress the high-pressure air permeability of the woven fabric. A "circular cross-section" here means that the ratio of the long diameter and short diameter in a cross-section (the aspect ratio) is 0.8 to 1.0.

For the woven fabric of the invention, in the melting endothermic curve measured with a rising-temperature DSC (differential scanning calorimeter), the ratio of the amount of heat absorbed on the high-temperature side exceeds 45% of the overall heat absorbed. More preferably, it exceeds 50%. Even more preferably, it exceeds 55%. A sample of the woven fabric is heated from room temperature at 5° C./min, the endothermic curve upon melting is observed, the melting behavior is divided into low-temperature side melting and high-temperature side melting for reference temperatures, and the ratio of the high-temperature side melting endotherm is determined. The reference temperature is the maximum temperature of the melting endotherm when the constituent threads of the woven fabric obtained by disassembling the woven fabric have been observed by DSC under the same temperature elevating conditions. The maximum heat-absorption temperature is usually observed as the melting point. For melting of the woven fabric, a high ratio of melting at a higher temperature than the melting point of the constituent yarns will suppress air permeation and increase damage avoidance during high-temperature deployment of the air bag. If the high temperature heat-absorbing sections have a large peak further toward the high temperature side than the melting point peak exhibited by the constituent yarn of the woven fabric, then presumably mutual constraint between the weaving yarn will result in crystal melting without heat absorption by relaxation of the orientation of the polymer chains of the weaving yarn. On the other hand, the low-temperature heat-absorbing sections often exhibit a narrow peak at the lower temperature than the melting point peak exhibited by the constituent yarns, thought to be due to the fact that they have relaxed heat orientation without constraint in the crimp structure of the woven fabric, so that heat absorption proceeds. With low heat absorption at lower temperature than the melting point of the constituent yarn, there is less variation in air permeability upon passage of time with heat-treatment, and the allowable air permeability range is no longer exceeded.

While it is preferred for the ratio of the amount of heat absorbed on the high-temperature side to be high, and preferably 100%, there is a limit to weaving yarn constraint by the woven fabric structure, and it is therefore up to about 80%.

If the ratio of the amount of heat absorbed on the high-temperature side is high and mutual constraint between the weaving yarn is high, then elongation of the woven fabric in the bias direction will be suppressed. Usually, the tensile elongation of a woven fabric is such that elongation is greater in the bias direction than in the weaving yarn direction, and the sections where the sewing lines of the air bag run along not the weaving yarn direction but rather the bias direction, are the sections of high gas leakage when stress has been applied by gas deployment. Consequently, a woven fabric with a high ratio of the amount of heat absorbed on the high-temperature side can yield an air bag with suppressed gas leakage. In addition, the sections where the sewing lines run along the bias direction have concentrated strain and constitute concentration points under the stress of gas deployment, but a woven fabric with a high ratio of the amount of heat absorbed on the high-temperature side can yield an air bag with suppressed damage at the sewn sections caused by stress concentration.

According to the invention, it is important to create a curved form where the weaving yarn is sufficiently interlocking on the loom, which will increase the ratio of the amount of heat absorbed on the high-temperature side. A curved form where the weaving yarn is sufficiently interlocking is created by first setting a high warp yarn tension, creating effective beating conditions. The warp yarn tension is preferably 0.20 to 0.65 cN/dtex. A warp yarn tension of 0.20 cN/dtex or greater will increase the contact angle. On the other hand, a warp yarn tension of no greater than 0.65 cN/dtex will avoid occurrence of weaving impediments such as warp yarn breakage and the like. It is more preferably 0.25 to 0.55 cN/dtex. The warp yarn tension can be adjusted upon measuring the warp yarn tension between the warping beam and a back roller (tensioning roller). The curved form of the weaving yarn formed by weaving should be maintained throughout the subsequent steps in order to avoid relaxation. The loom used may be a water jet loom, airjet loom, rapier loom or the like. It is preferred to use a water jet loom among these, since it will allow control to a low amount of oil coverage without a subsequent scouring step.

The cover factor of the woven fabric is preferably 2000 to 2600. The cover factor (CF) is calculated in the following manner.

CF=Warp density (number/2.54 cm)×√warp yarn fineness (dtex)+weft density (number/2.54 cm)× √weft yarn fineness (dtex)

The cover factor is the extent to which the yarns fill the plane, and if it is 2000 or greater the static air permeability will be suppressed. A cover factor of no greater than 2600 can avoid difficulties in the weaving step.

The woven texture of the woven fabric is preferably a plain weave fabric with sole yarn, and basically of the same yarn for warp and weft. In order to obtain a high-density plain weave fabric, both the warp and weft may be woven by a double mat weave to obtain a plain weave fabric.

The woven fabric of the invention preferably has constraint among the weaving yarn by spreading of filament bundle of warp or weft weaving yarn forming the woven fabric. In other words, in a cross-section of the woven fabric, as the converging conditions for the filaments of the weaving yarn, where the flatness of the weaving yarn is defined as the ratio of spread of the filaments in the planar direction of the woven fabric with respect to the spread of the filaments in the thickness direction of the woven fabric (planar direction/ thickness direction), preferably the larger of the warp yarn flatness and weft yarn flatness is between 4.5 and 3.0, inclusive. The value is more preferably 3.5 or greater. If the weaving yarn flatness is 3.0 or greater the filament groups will satisfactorily spread, and if either the warp yarn or weft yarn flatness is 3.0 or greater, this will contribute to mutual constraint of the warp yarn and weft yarn. In order to increase the weaving yarn flatness, it is effective to increase the warp yarn tension during weaving. Increasing the warp yarn tension results in firm mutual constraint among the warp and weft weaving yarn by increasing the flatness of the warp yarns.

The weaving yarn is preferably supplied for weaving without twisting and without sizing. When weaving yarn is woven as twisted yarn, the converging property of the filament group becomes too pronounced, with a weaving yarn flatness of less than 2.5, for example, and constraint of the warp and weft will not be firm.

In the scouring step after weaving, the curved form of the thoroughly interlocking weaving yarn formed in the weaving step tends to disappear by contraction of the synthetic fibers in hot water, and therefore care must be taken. There should be used a scouring method at a temperature of preferably no higher than 80° C., more preferably no higher than 60° C. and even more preferably no higher than 50° C., in a widened state without application of stimulation such as rubbing. The scouring step is most preferably omitted.

Care must be taken so that the satisfactorily interlocked state of the weaving yarn produced in the weaving step is not lost even in the dry finishing step. It is necessary to avoid sudden contraction of the synthetic fibers. Drying treatment is at preferably no higher than 140° C. and more preferably no higher than 120° C. The drying may also be carried out in stages. In addition, a cylinder dryer or a tenter apparatus may be used, and drying may even be carried out with a combination thereof.

The woven fabric of the invention preferably has an oil content (oil adhesion rate), as extracted with cyclohexane, of 0.05 wt % to 0.20 wt % with respect to the woven fabric weight. It is more preferably 0.05 to 0.15 wt %. It is yet more preferably 0.05 to 0.10 wt %. A cyclohexane-extracted oil content of 0.05 wt % or greater can reduce abrasion on the surface of the weaving yarn filaments, and prevent loss of tear strength of the woven fabric. It can therefore increase the puncture resistance of the air bag. If it is no greater than 0.20 wt %, on the other hand, loss of the constituent yarns will be prevented, making it possible to avoid tearing of the bag by leakage of the deployment gas of the air bag or concentrated permeation of hot gas. In order to obtain an extracted oil content of between 0.05 wt % and 0.20 wt %, the spinning oil from the weaving yarn production step or the warping oil in the warping step for the warp yarn of the weaving yarn may be deoiled in a water jet loom step in which the woven fabric is produced, or the conditions for the scouring step after weaving may be set as appropriate, or oil may be added to the woven fabric for finishing. Preferably, the spinning oil and warping oil are applied in suitable amounts by a water stream in the water jet loom step, and any separate scouring step is omitted.

The air permeability of the woven fabric of the invention is preferably no greater than 0.3 cc/cm$^2$/s, based on the Frazier method with a differential pressure of 125 Pa, and preferably as little air permeation as possible is detected.

Also, the woven fabric preferably has an air permeability of no greater than 0.5 cc/cm$^2$/s and more preferably no greater than 0.3 cc/cm$^2$/s after hot air oven treatment at 110° C. for 100 hours. Preferably, no air permeability is detected.

The woven fabric of the invention may be cut and assembled directly without resin finishing, for suitable use in an air bag.

A sewn air bag comprising the woven fabric of the invention may be incorporated for use as an air bag module or air bag device.

EXAMPLES

The present invention will now be explained by examples and comparative examples, with the understanding that the invention is in no way limited only to the examples. The measurement methods and evaluation methods used in the present specification will be explained first.

(1) Preparation of woven fabric sample: Preparation is under the standard conditions of JIS L0105:2006, and it is supplied for the different measurements and evaluations.

(2) tan δ peak temperature: The dynamic viscoelasticity was measured using a DDV-01FP Rheovibron by Orientech Co., Ltd. The sample used was a bundle of about 10 filaments removed from the constituent yarn, obtained by disassembling the woven fabric. The tan δ was measured with a chuck distance of 30 mm, a frequency of 35 Hz, a temperature-elevating rate of 5° C./min and a temperature range of 40° C. to 200° C. The tan δ peak temperature (° C.) was determined from the tan δ-temperature curve.

(3) DSC analysis: A woven fabric sample was cut to a size capable of being loaded in a sampling pan, without disturbing the woven state of the fabric, loading in approximately 5 mg. The constituent yarn of the woven fabric was loosened into warp and weft yarns and cut to lengths capable of being loaded into the sampling pan (#346-66963-91), loading in approximately 5 mg. A endothermic curve was obtained with melting using a DSC-60 by Shimadzu Corp., at a temperature-elevating rate of 5° C./min in an atmosphere with an air stream of 100 ml/min. A baseline was drawn between 230° C. and 280° C., and the endotherm was analyzed. The average endothermic maximum temperature (melting point) for the warp and weft constituent thread of the woven fabric was used as the reference temperature. The endothermic curve of the woven fabric was divided into a low-temperature side and high-temperature side with respect to the reference temperature, and the ratio (%) of the amount of heat absorbed on the high-temperature side in the endothermic curve was calculated.

(4) Raw yarn properties: The strength was measured based on the tensile strength evaluation method of JISL1013 (2010)8.5, with a grip spacing of 25 cm and a constant extension rate of 30 cm/min, and the boiling water shrinkage ratio was measured based on the boiling water shrinkage factor evaluation method of JISL1017 (2002) 8.14.

(5) Woven density: This was measured according to Appendix FA of the JIS TL1096:2010 8.6.1b) Method B.

(6) Oil adhesion rate: A woven fabric sample was subjected to 8 hours of Soxhlet extraction with a cyclohexane solvent. After removing the volatile component from the obtained liquid extract, the extracted component was weighed and the extracted oil weight with respect to the woven fabric weight before extraction was recorded as the oil adhesion rate (wt %).

(7) Constituent yarn fineness: This was measured according to Appendix H of JIS L1096:2010 8.9.1.1a) 2) B (Method B).

(8) Flatness of woven fabric yarn: The yarn of the woven fabric was cut at the thread center, and the converging contour of filament bundles of the yarn was observed at the cross-section, for both the warp and weft. The ratio of spread of filaments in the planar direction of the woven fabric with respect to spread of the filaments in the thickness direction of the woven fabric (planar direction/thickness direction) was recorded as the flatness.

(9) Frazier air permeability: The air permeability was determined according to JIS L1096:2010 8.26.1, Method A.

(10) Evaluation of air permeability after passage of time with heat-treatment: A woven fabric sample was placed in an air oven at 110° C. and allowed to stand for 100 hours, after which the air permeability was evaluated according to (9) above.

(11) Damage by high-temperature deployment: A model air bag with a diameter of 50 cm, assembled into a form such as shown in FIG. 4(a) from two woven fabric samples mutually sewn at 45° in the weaving direction, was wound into a roll to a diameter of no greater than 25 mm, as shown in FIG. 4 (b), bound at two locations with a 30 dtex monofilament as show in FIG. 4 (c), and mounted on a CGS system gas injection device by Microsysm, Japan. The bag portion was placed in a hot air oven and allowed to stand at 105° C. for 30 minutes. Next He gas (6 MPa, 1L) was abruptly introduced at high speed through a gas inlet, and the time (msec) from introduction until a gas leakage to 20 KPa after the internal preached maximum pressure exceeding 50 kPa, was measured and recorded as the holding time or inner pressure.

Example 1

A polyhexamethyleneadipamide resin was melt spun and hot-drawn, and the obtained fiber with a strength of 8.5 cN/dtex were used as weaving yarn. The fiber contained 50 ppm copper and 1500 ppm iodine, added during resin polymerization. The yarn had a fineness of 470 dtex, with 136 filaments, and a boiling water shrinkage ratio of 7.5%, and the number of tangles in water immersion was 15/m. For the warp yarn, the filaments were non-twisted, non-sized and aligned, and used for the warping beam, and for the weft thread, filaments were non-twisted, non-sized and directly supplied to the loom from the take-up package. With a water jet loom, the warp yarn tension on the loom was set to 0.40 cN/dtex, and a plain weave fabric was obtained at 400 rpm. The obtained woven fabric was dried with 4 pairs of cylinders at 120° C., without scouring, and then a pin tenter was used for finishing with 30 seconds of residence at 110° C., with a warp overfeed contraction of 0.5% and a tentering percentage of 0.5%. The looming density during weaving was adjusted to a finished fabric woven density of 53.0/2.54 cm for both warp and weft. The production conditions and evaluation results for the woven fabric are shown in Table 1.

Figure 2:
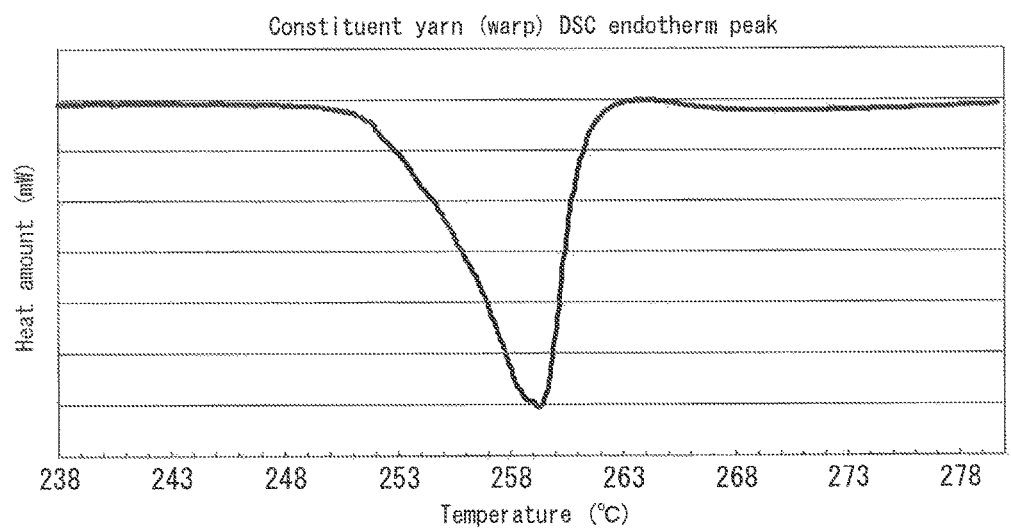
FIG. 2 is a graph showing a DSC endothermic curve for constituent yarn (warp) in a woven fabric of the invention.
Figure 3:
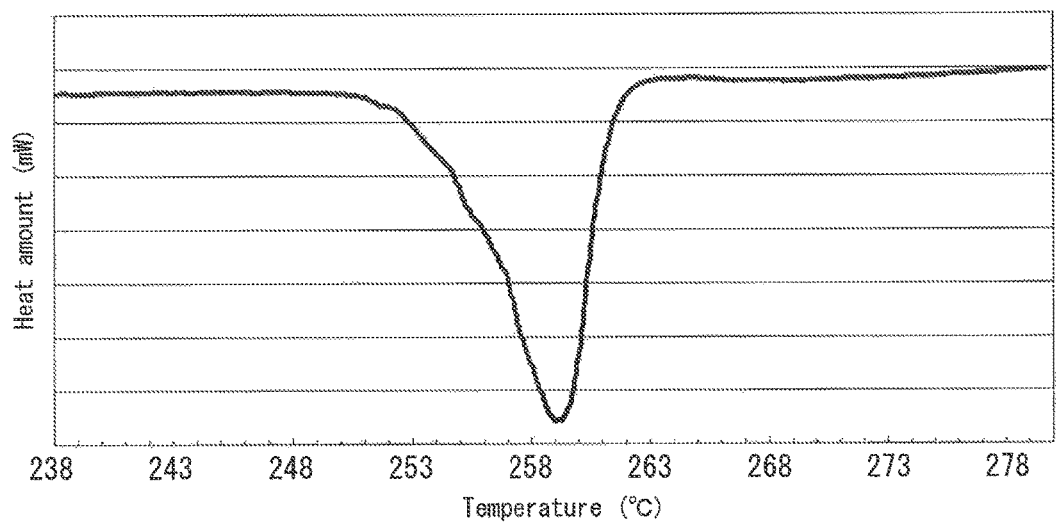
FIG. 3 is a graph showing a DSC endothermic curve for constituent yarn (weft) in a woven fabric of the invention.

The oil adhesion rate of the woven fabric was 0.12 wt %, and deoiling was appropriately carried out with a water jet loom. In observation of the weaving yarn cross-section, the flatness of the filament bundle of warp yarn was higher than for the warp yarn, at 4.0 (In Examples 2 to 5 and Comparative Examples 1 to 4 as well, the flatness of the woven fabric yarn was highest for the warp thread). The tan δ peak temperature was 125° C. in measurement of the viscoelasticity of the constituent thread obtained by disassembling the woven fabric. Also, in DSC analysis of the constituent yarn, the melting point (maximum heat absorption temperature) was 259.0° C. for both warp and weft, and the ratio of the amount of heat absorbed on the high-temperature side of the melting point in the endothermic curve was 32% for both warp and weft (FIG. 2 and FIG. 3). In DSC analysis of the woven fabric, the ratio of the amount of heat absorbed on the high-temperature side was 54% (FIG. 1).

The woven fabric had low air permeability, which remained low even after passage of time with heat-treatment. Also, the air bag comprising the woven fabric had excellent suppression of air permeability with high-temperature deployment, and satisfactory thermal stability.

Example 2

This was carried out in the same manner as Example 1, except that the warp yarn tension during weaving was 0.30 cN/dtex. The production conditions and evaluation results for the woven fabric are shown in Table 1. The air permeability after passage of time with heat-treatment tended to increase, but was sufficiently low air permeability. The suppression of air permeability with high-temperature deployment was also excellent.

Example 3

This was carried out in the same manner as Example 1, except that a 1 minute scouring step with hot water at 50° C. after weaving was added. The production conditions and evaluation results for the woven fabric are shown in Table 1. The air permeability after passage of time with heat-treatment tended to increase, but was low air permeability. The suppression of air permeability with high-temperature deployment was also excellent.

Example 4

This was carried out in the same manner as Example 1, except that the raw yarn strength was 8.0 cN/dtex. The production conditions and evaluation results for the woven fabric are shown in Table 1. The tan δ peak temperature of the woven fabric thread was 121° C. The air permeability after passage of time with heat-treatment tended to increase, but was sufficiently low air permeability. The suppression of air permeability with high-temperature deployment was also excellent.

Example 5

A woven fabric was obtained in the same manner as Example 1, except that the raw yarn strength was 8.0 cN/dtex and the boiling water shrinkage ratio was 10.5%. The production conditions and evaluation results for the woven fabric are shown in Table 1. The tan δ peak temperature of the woven fabric thread was 115° C. The air permeability after passage of time with heat-treatment tended to increase, but was sufficiently low air permeability. The suppression of air permeability with high-temperature deployment was also excellent.

Comparative Example 1

A woven fabric was obtained in the same manner as Example 1, except that the warp thread tension during weaving was 0.25 cN/dtex, and a 3 minute scouring step with hot water at 90° C. after weaving was added. The production conditions and evaluation results for the woven fabric are shown in Table 1. The air permeability increased after passage of time with heat-treatment. The suppression of air permeability with high-temperature deployment was also impaired. In DSC analysis of the woven fabric, the ratio of the amount of heat absorbed on the high-temperature side was 36%. This resembled the melting endotherm curve of the constituent yarns, and an endothermic peak at the high-temperature side due to weaving yarn constraint was barely observed.

Comparative Example 2

A woven fabric was obtained in the same manner as Comparative Example 1, except that scouring was not carried out. The production conditions and evaluation results for the woven fabric are shown in Table 1. The air permeability increased after passage of time with heat-treatment. The suppression of air permeability with high-temperature deployment was also impaired.

Comparative Example 3

A woven fabric was obtained in the same manner as Example 1, except that the warp thread tension during weaving was 0.30 cN/dtex, and a 3 minute scouring step with hot water at 90° C. was added after weaving. The production conditions and evaluation results for the woven fabric are shown in Table 1. The air permeability increased after passage of time with heat-treatment. The suppression of air permeability with high-temperature deployment was also impaired.

Comparative Example 4

A woven fabric was obtained in the same manner as Example 1, except that the raw yarn strength was 7.5 cN/dtex and the boiling water shrinkage ratio was 1.1.0%. The production conditions and evaluation results for the woven fabric are shown in Table 1. The tan δ peak temperature of the woven fabric thread was 110° C. The air permeability increased after passage of time with heat-treatment. The suppression of air permeability with high-temperature deployment was also impaired.

TABLE 1

| | | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|---|
| Raw yarn strength | cN/dtex | 8.5 | 8.5 | 8.5 | 8.0 | 8.5 | 8.5 | 8.5 | 8.5 | 7.5 |
| Raw yarn boiling water shrinkage | % | 7.5 | 7.5 | 7.5 | 7.5 | 10.5 | 7.5 | 7.5 | 7.5 | 11.0 |
| Warp yarn tension | cN/dtex | 0.40 | 0.30 | 0.40 | 0.40 | 0.40 | 0.25 | 0.25 | 0.30 | 0.40 |
| Scouring performed and temperature | °C. | None | None | 50 | None | None | 90 | None | 90 | None |
| Oil adhesion rate | % | 0.12 | 0.12 | 0.08 | 0.12 | 0.12 | 0.03 | 0.12 | 0.03 | 0.12 |
| Warp yarn cross-section flatness | | 4.0 | 3.8 | 4.0 | 4.0 | 4.0 | 2.5 | 2.5 | 3.8 | 4.0 |
| Ratio of heat absorption on high-temperature side | % | 53 | 52 | 51 | 52 | 48 | 13 | 43 | 41 | 42 |
| Constituent thread melting point (reference temperature) | °C. | 259 | 259 | 259 | 259 | 259 | 259 | 259 | 259 | 259 |
| Constituent thread tanδ peak temperature | °C. | 125 | 125 | 125 | 121 | 115 | 125 | 125 | 125 | 110 |
| Frazier air permeability | Cc/cm$^2$/sec | 0.08 | 0.08 | 0.08 | 0.08 | 0.08 | 0.12 | 0.10 | 0.08 | 0.08 |
| Frazier air permeability after passage of time with heat | Cc/cm$^2$/sec | 0.08 | 0.18 | 0.30 | 0.20 | 0.35 | 0.65 | 0.52 | 0.55 | 0.55 |
| Pressure Holding time after passage of time with heat treatment | msec | 500 | 480 | 480 | 480 | 400 | 50 | 200 | 100 | 150 |

INDUSTRIAL APPLICABILITY

The woven fabric of the invention is suitable as a woven fabric for an air bag. It is most suitable as a woven fabric for an air bag to be used in a non-Coated sewn air bag with excellent thermal stability.

The invention claimed is:

1. A woven fabric comprising synthetic fibers, wherein the woven fabric is not coated with a resin, in a rising-temperature DSC endothermic curve of the woven fabric, the ratio of the amount of heat absorbed on the high-temperature side of the peak temperature of the melting endotherm in the rising-temperature DSC endothermic curve of the constituent yarn of the woven fabric, to the overall heat absorbed exceeds 45%, the larger of the flatnesses of the warp yarn and weft yarn constituting the woven fabric (spread of filaments in planar direction/spread of filaments in thickness direction) is 3.0 or greater, and the Frazier air permeability after exposure to an environment of 110° C. for 100 hours is no greater than 0.5 cc/cm$^2$/sec.

2. The woven fabric according to claim 1, wherein the tan δ peak temperature of viscoelasticity of the constituent yarn of the woven fabric is 115° C. or higher.

3. The woven fabric according to claim 1 or 2, wherein the oil adhesion rate is between 0.05 wt % and 0.20 wt %, inclusive.

4. The woven fabric according to claim 1 or 2, wherein the synthetic fiber is polyamide 66 fiber.

5. The woven fabric according to claim 1 or 2, wherein the cross-section of the filaments of the constituent yarn of the woven fabric is a circular cross-section.

6. The woven fabric according to claim 1 or 2, wherein the strength of the raw yarn used for weaving is 8.0 cN/dtex or greater.

7. The woven fabric according to claim 1 or 2, wherein the warp yarn tension during weaving is 0.20 to 0.65 cN/dtex.

8. The woven fabric according to claim 1 or 2, which is produced by weaving with a water jet loom, and is followed by dry finishing either without scouring or with scouring at no higher than 80° C.

9. The woven fabric according to claim 1 or 2, wherein the dry finishing after weaving is carried out at no higher than 140° C.

10. An air bag employing the woven fabric according to claim 1 or 2.

* * * * *